United States Patent
Patterson et al.

(10) Patent No.: US 9,874,097 B2
(45) Date of Patent: *Jan. 23, 2018

(54) SHROUD FOR ROTARY ENGINE

(71) Applicant: Exponential Technologies, Inc., Calgary (CA)

(72) Inventors: Curtis Patterson, Calgary (CA); Kristjan Gottfried, Calgary (CA); Alejandro Juan, Calgary (CA)

(73) Assignee: Exponential Technologies, Inc., Calgary (CA)

( * ) Notice: Subject to any disclaimer, the term of this patent is extended or adjusted under 35 U.S.C. 154(b) by 222 days.

This patent is subject to a terminal disclaimer.

(21) Appl. No.: 14/834,255

(22) Filed: Aug. 24, 2015

(65) Prior Publication Data
US 2015/0361794 A1 Dec. 17, 2015

Related U.S. Application Data

(62) Division of application No. 13/162,436, filed on Jun. 16, 2011, now Pat. No. 9,115,646.

(60) Provisional application No. 61/355,880, filed on Jun. 17, 2010.

(51) Int. Cl.
| | | |
|---|---|---|
| F01C 1/08 | (2006.01) | |
| F01C 3/08 | (2006.01) | |
| F01D 1/32 | (2006.01) | |
| F02C 3/16 | (2006.01) | |
| F02C 5/00 | (2006.01) | |

(52) U.S. Cl.
CPC ........ F01C 1/086 (2013.01); F01C 3/08 (2013.01); F01D 1/32 (2013.01); F02C 3/165 (2013.01); F02C 5/00 (2013.01)

(58) Field of Classification Search
CPC .................... F01C 1/086; F01C 3/08
USPC ........................................ 418/195
See application file for complete search history.

(56) References Cited

U.S. PATENT DOCUMENTS

| | | |
|---|---|---|
| 2,242,058 A | 5/1941 | Cuny |
| 2,828,695 A | 4/1958 | Wilmott |
| 3,101,700 A | 8/1963 | Bowdish |
| 3,769,944 A | 11/1973 | Raymond |
| 3,773,442 A | 11/1973 | Mitchell et al. |
| 3,845,562 A | 11/1974 | Dallas |
| 3,971,603 A | 7/1976 | Bjerk |
| 3,982,861 A | 9/1976 | Gibson |
| 4,872,815 A | 10/1989 | Takai |
| 5,513,969 A | 5/1996 | Arnold |
| 7,275,920 B2 | 10/2007 | Arnold |
| 7,351,047 B2 | 4/2008 | Kawakami et al. |
| 8,602,758 B2 | 12/2013 | Juan et al. |
| 8,834,140 B2 | 9/2014 | Arnold et al. |
| 9,115,646 B2 | 8/2015 | Patterson et al. |
| 2007/0253851 A1 | 11/2007 | Arnold |
| 2010/0074786 A1 | 3/2010 | Juan et al. |
| 2013/0200634 A1 | 8/2013 | Patterson et al. |

FOREIGN PATENT DOCUMENTS

GB 805370 A 12/1958

*Primary Examiner* — Mary A Davis
(74) *Attorney, Agent, or Firm* — Schacht Law Office, Inc.; Dwayne Rogge

(57) ABSTRACT

Disclosed herein are several embodiments for shroud arrangements to be used in rotary engines using a plurality of rotors within the shroud arrangement. At least one of the rotors is not fixed to the shroud.

20 Claims, 16 Drawing Sheets

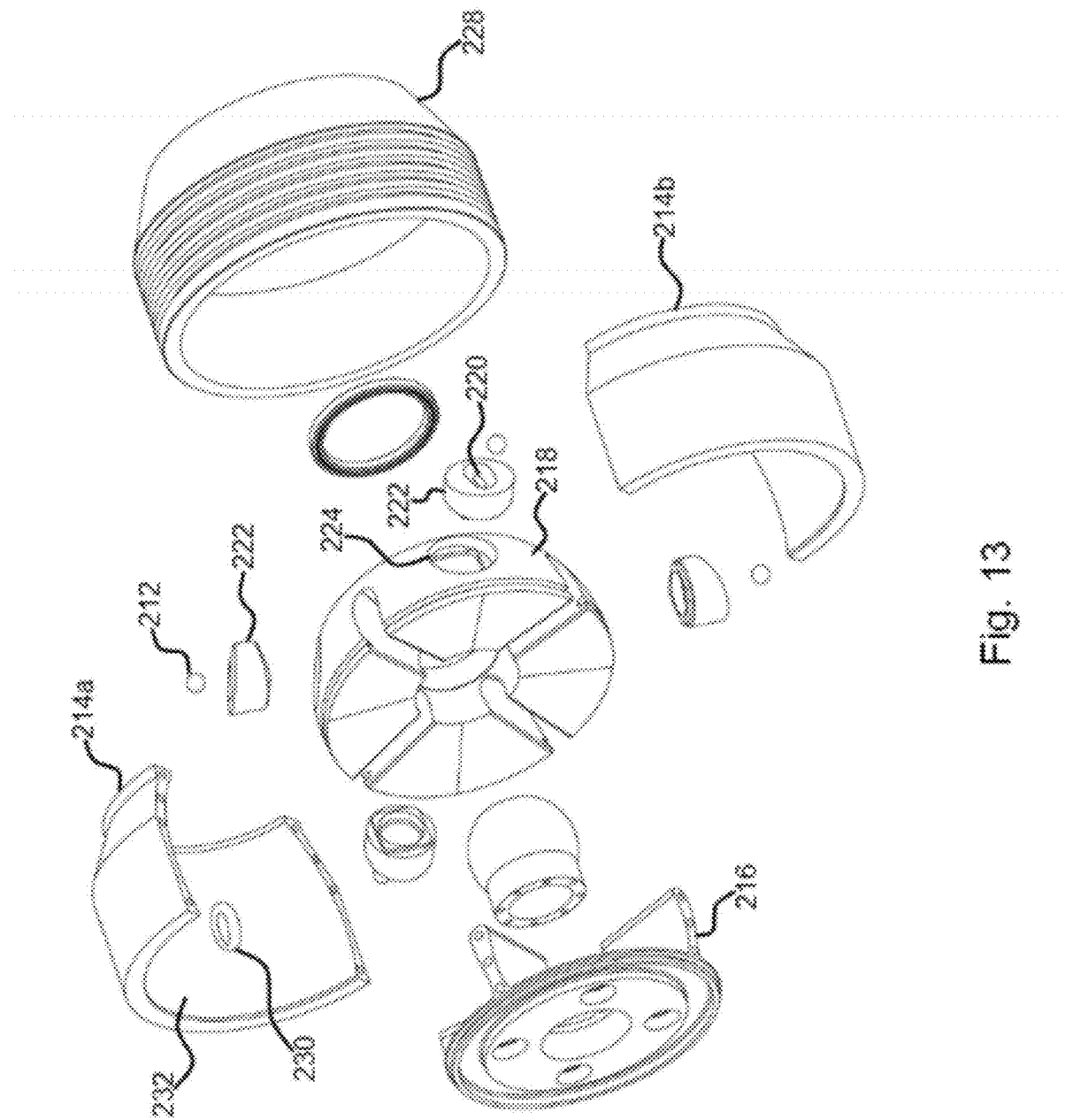

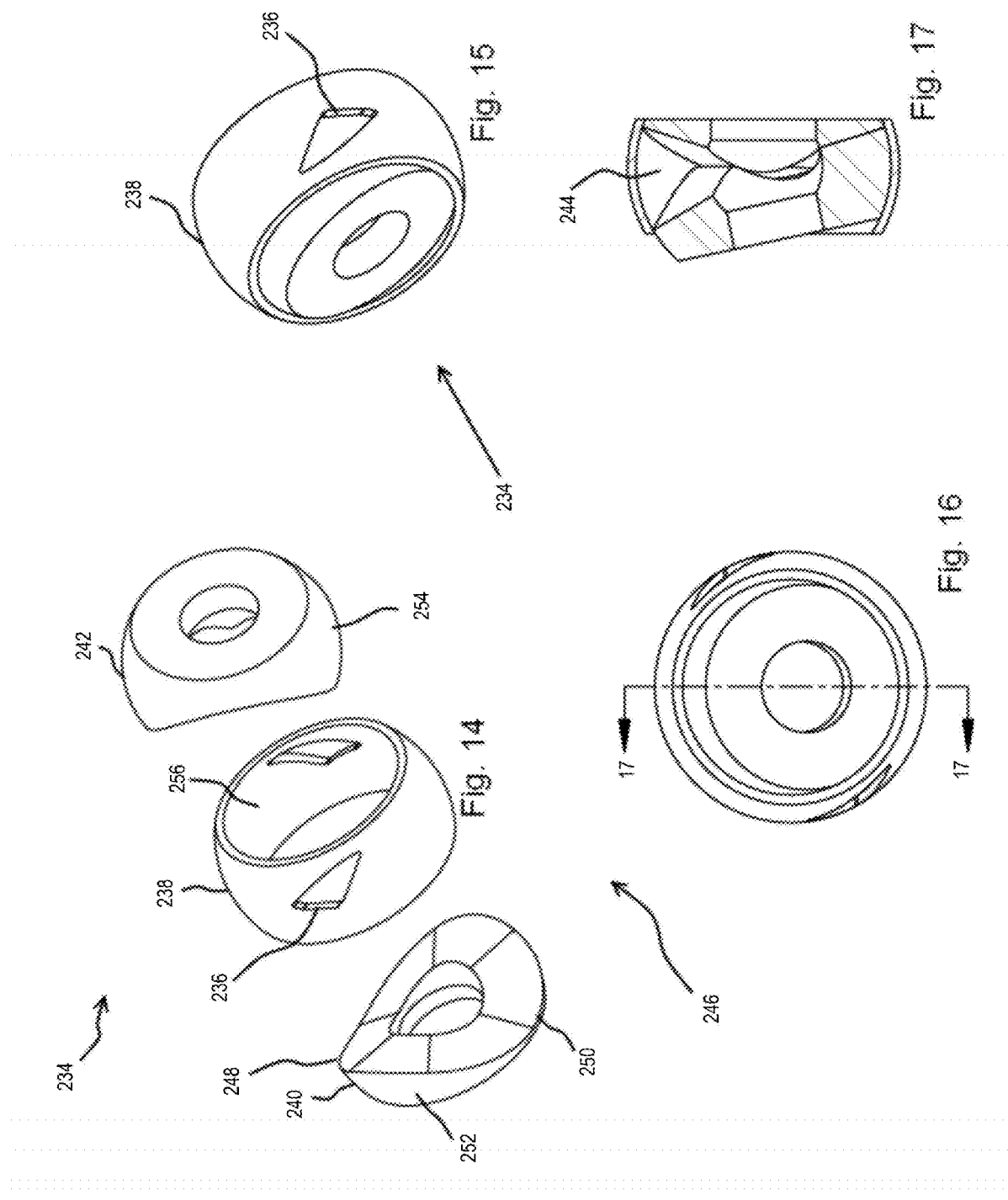

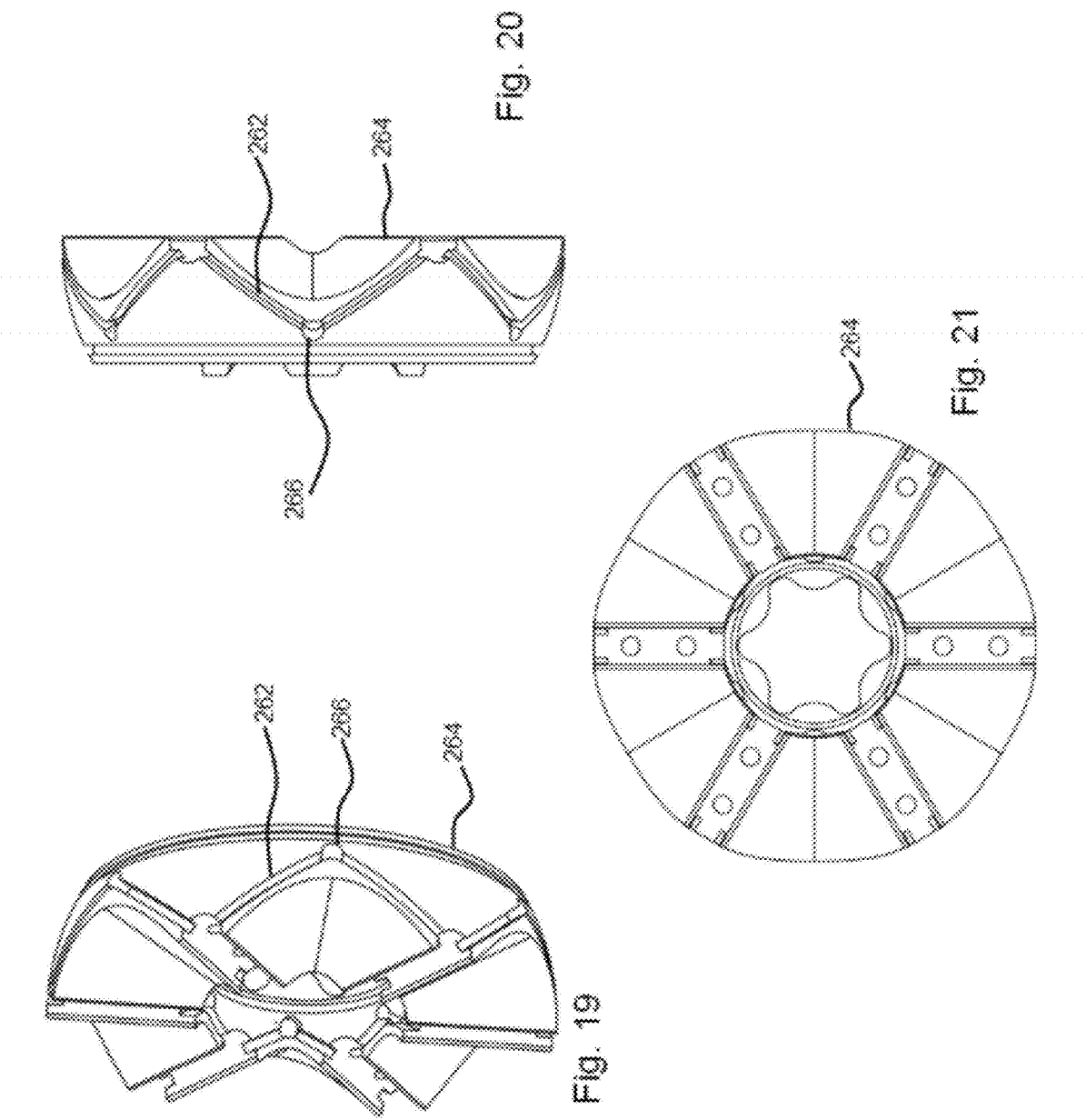

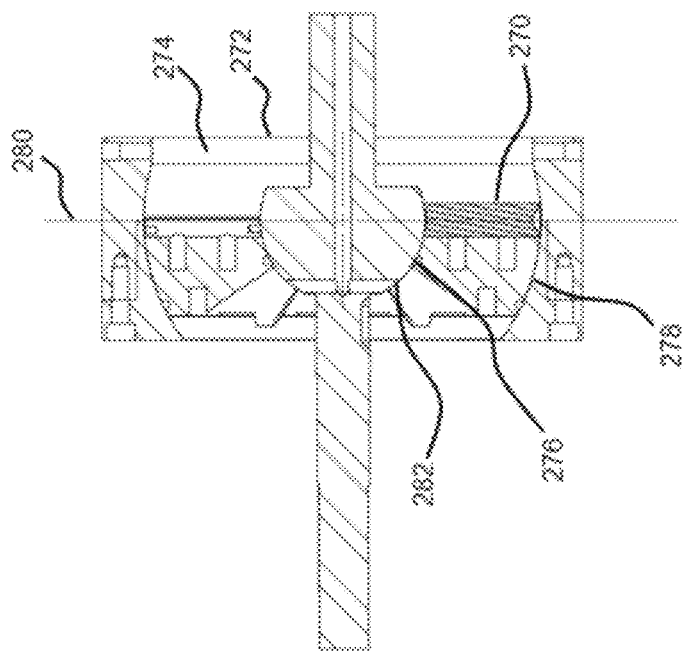
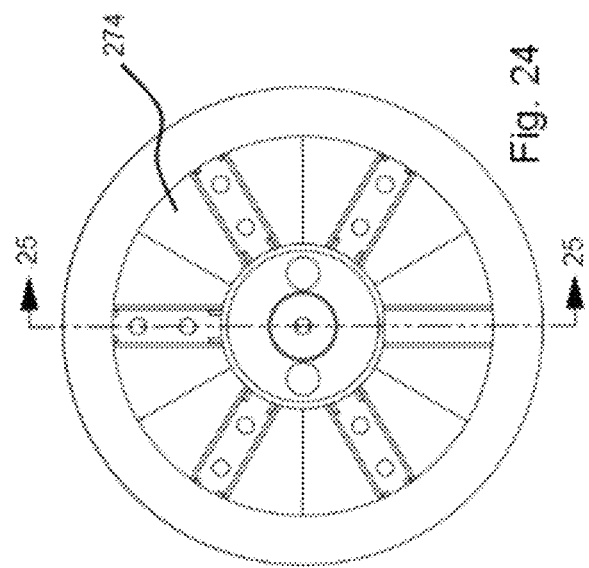
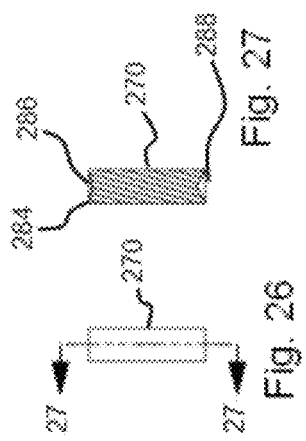
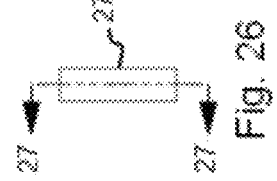

SHROUD FOR ROTARY ENGINE

RELATED APPLICATIONS

This application claims priority benefit of U.S. Provisional Patent Application Ser. No. 61/355,880, filed Jun. 17, 2010 incorporated herein by reference and is a Divisional Application of U.S. patent application Ser. No. 13/162,436 filed Jun. 16, 2011 also incorporated herein by reference.

BACKGROUND OF THE DISCLOSURE

Field of the Invention

This disclosure relates the field of shrouds for rotary engine devices wherein the shroud is configured to rotate with at least one rotating component of the engine to reduce the relative rotary motion between the shroud and the associated rotating component of the engine and significantly decrease the net leakage of lubricant through the positive displacement device.

SUMMARY OF THE DISCLOSURE

Disclosed herein is a rotor assembly comprising: a shaft wherein a thrust load from a rear portion of a first rotor whose axis of rotation is not parallel to the axis of rotation of the shaft is transferred to the shaft through a first thrust bearing whose axis of rotation is concentric with that of the first rotor, and wherein the first thrust bearing then acts upon a wedge shaped plate with the angle of the wedge equal to the angle between the axis of rotation of the first rotor and the axis of rotation of the shaft. The wedge shaped plate then acts against a second thrust bearing comprising and axis of rotation which is concentric with the axis of rotation of the shaft, and the thrust bearing then acts against a second thrust plate fixedly attached to the shaft.

The rotor assembly may be arranged wherein the thrust load acting upon the first rotor is transmitted to the shaft by means of a load bearing component configured in such a manner as to load the shaft in tension.

Also disclosed herein is a rotor assembly comprising a plurality of rotors comprising at least a first and a second rotor. Each rotor has respective center axes that are offset from co-linear. Each rotor has lobes and valleys. The first and a second rotor each comprise an outer surface forming part of a spherical surface arranged in such a way that each outer partial spherical surface shares a common center. A shroud body is disclosed comprising an inner spherical surface operatively configured to surround the outer spherical surfaces of the rotors and the shroud body rotates at some angular velocity in the same direction as the rotors.

The rotor assembly as described above may be arranged where the shroud body comprises a plurality of axially split inner shroud components to facilitate assembly over the outer spherical surfaces of the first and/or second rotors.

The rotor assembly may alternatively be arranged where the shroud body is supported by a circumferential sleeve in such a way that radial forces from the shroud body are taken up as hoop stress in the sleeve. Such a shroud body could comprise a plurality of circumferentially split inner shroud components to facilitate assembly over the outer spherical surfaces of the rotors. This shroud arrangement may be configured where the shroud body is surrounded by a sleeve in such a way that radial forces from the shroud body are taken up as hoop stress in the sleeve. In one form the sleeve is coupled to the shroud body by an interference fit that places an inward radial preload on the inner shroud components. The rotor assembly may be configured where the shroud body is fixed in relation to the first rotor in such a way that relative motion only occurs between the shroud body and the second rotor. Such a rotor assembly may use a shroud body which is integral and monolithic with the body of the first rotor. The shroud body may alternatively rotate on an axis that is distinct from the axes of the first and the second rotors.

The rotor assembly may be arranged where the shroud body comprises one or more surfaces defining radial ports that are shaped in such a way as to be blocked by lobes of the first or second rotor during part of a rotation, and not blocked by lobes for the remainder of the rotation. In one form, the ports are blocked by lobes of the second rotor.

In one embodiment an associated inter-lobe volume is increasing in such a way that the ports act as fluid inlet ports. In an alternate form, the associated inter-lobe volume is decreasing in such a way that the ports act as fluid outlet ports.

In one embodiment, the rotors comprise a plurality of circumferentially oriented seals which engage with the inner spherical surface of the shroud.

The seal members may comprise positive contact seals selected from the list consisting of mechanical seals and polymer lip seals. The seal members may alternatively comprise non-contacting seals selected from the list consisting of labyrinth seals and gas lubricated mechanical seals. The seal members consist of a single monolithic seal member, and may be integral and monolithic with the first and/or second rotor. In one form, the seal members comprise a plurality of S-shaped seals.

In one embodiment, the seal members comprise a plurality of planar seals where the seal bodies themselves are curved in one direction to contact the inner frusto-spherical surface of the shroud.

To facilitate sealing, one or more rotors may comprise radial grooves in the apex of each rotor lobe in which is fitted a plurality of seal bodies operatively configured to engage the lobes of the opposing rotor as well as engage the inner ball surface and inner shroud body surface. As such, the apex seal may contact the circumferentially oriented seals in such a way as to act as a continuous seal body.

In one arrangement the load due to high pressure fluid between the lobes is transferred from the back of the associated rotor through a thrust bearing to a wedge-shaped plate that is keyed to the housing, and then through another thrust bearing to a plate that is fixedly attached to and rotates with the shaft in such a way that the shaft is loaded in tension In another form, a rotor indexing device is integrated with the shroud to transfer torque between at least one of the first and/or second rotors and the shroud body. As such, the rotor indexing device may consist of spherical balls configured to roll in roughly oval tracks cut in both the shroud inner frusto-spherical surface and the rotor outer diameter. Alternatively, the indexing device consists of spherical balls configured to roll in roughly sinusoidal tracks cut in both the shroud body inner spherical surface and the outer surface or at least one rotor.

BRIEF DESCRIPTION OF THE DRAWINGS

FIG. 13 is an exploded view of the embodiment shown in FIG. 11.

FIG. 14 is an exploded view of another shroud embodiment.

FIG. 15 is an assembled view of the embodiment of FIG. 14.

FIG. 16 is a front view of the embodiment of FIG. 14.

FIG. 17 is a side cutaway view of the embodiment of FIG. 14.

FIG. 19 is an isometric view of another embodiment.

FIG. 20 is a side view of the embodiment of FIG. 19.

FIG. 21 is a front view of the embodiment of FIG. 19.

FIG. 24 is a front view of an embodiment of a rotor and housing assembly utilizing cylindrical apex seals.

FIG. 25 is a cutaway view taken along line 25-25 of FIG. 24.

FIG. 26 is a detail view of one embodiment of a cylindrical apex seal.

FIG. 27 is a cutaway view taken along line 27-27 of FIG. 26.

DESCRIPTION OF THE PREFERRED EMBODIMENTS

Herein, the term CvR is used to denote a rotary engine (pump, compressor, external combustion engine, etc.) such as described in the '674 application and its predecessors. The shroud assembly 20 described herein has many uses for CvR devices including the CvR devices described in U.S. application Ser. No. 12/560,674 ('674), filed on Sep. 16, 2009 and incorporated herein by reference.

Figure 1:
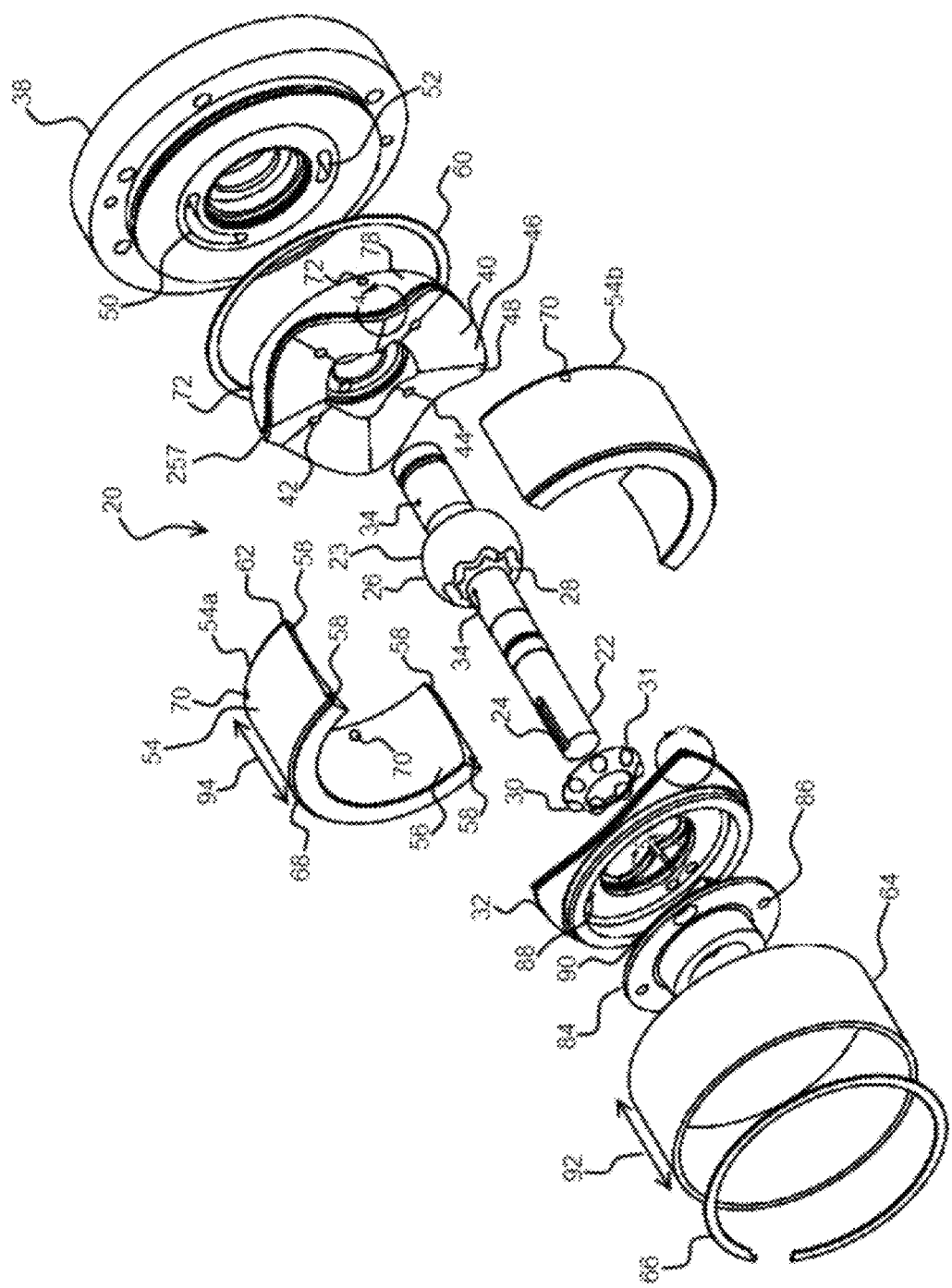
FIG. 1 is an isometric exploded view of one embodiment of the disclosure in a compressor assembly.
Figure 2:
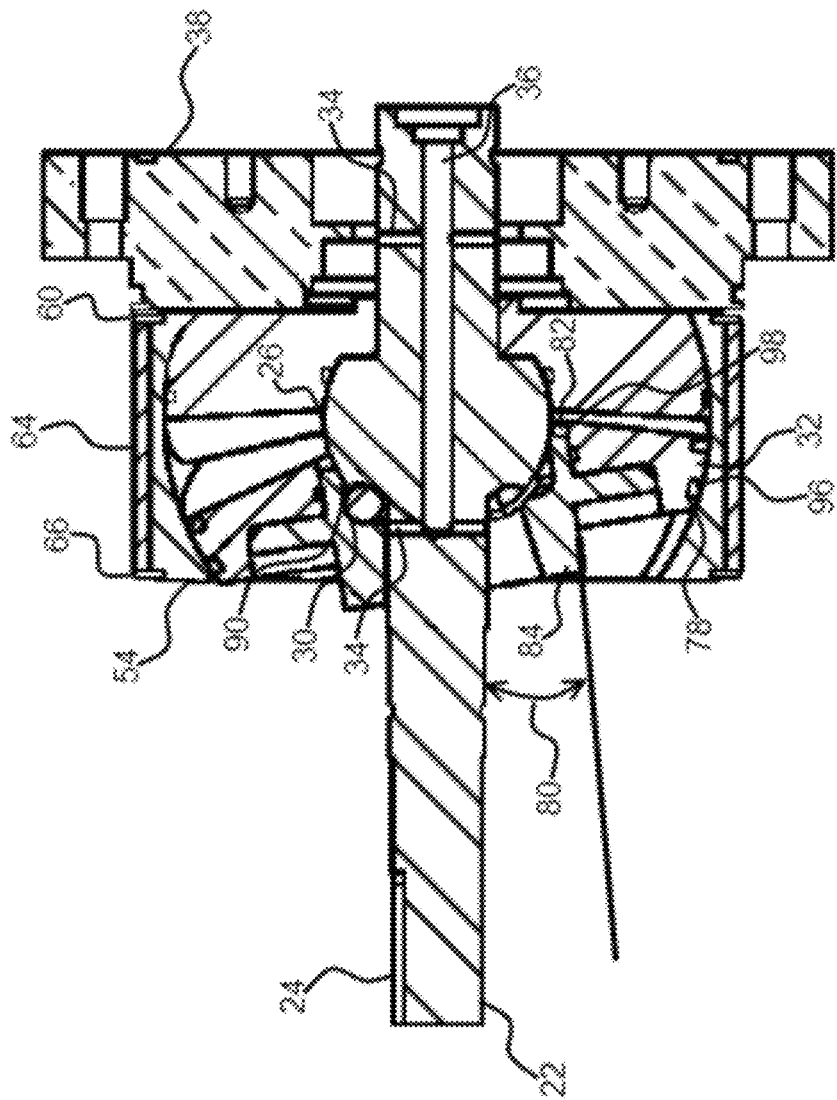
FIG. 2 is a cutaway-assembled view of one embodiment of the disclosure shown in FIG. 1.

Looking to the shroud assembly 20 shown in the embodiment of the compressor shown in FIGS. 1-5 from the inside out shows a shaft 22 having a key way 24, allowing for the shaft 22 to be driven by an external engine, or in some embodiments to allow the device to operate as an external combustion engine, in which case the shaft 22 and keyway 24 will drive other mechanisms. Attached to, or formed as part of the shaft 22 is a bearing 23 having a spherical surface 26 and an indexer surface 28, configured to interoperate with an indexer ring 30 which in one form is a plurality of spherical balls retained by a ring-shaped element to rotate a slave rotor 32 as described in the '674 application. In some embodiments, a plurality of lubricant ports 34 are provided, which allow for lubricant (such as for example oil) to be distributed between the shaft 22 and components against which the shaft 22 rotates or reciprocates, such as shown in FIG. 2, wherein a central oil channel 36 allows the lubricant to be distributed between the slave rotor 32 or back plate 38 and the shaft 22. A power rotor 40 is also provided, however, in some embodiments the power rotor 40 is configured to rotate with and not reciprocate relative to the shaft 22, and therefore an oil port may not be necessary therebetween. The power rotor 40, as shown in FIG. 1, is rear-ported through the ports 42 in the valleys 44 of the engagement surface 46 between adjacent mounds 48. The ports 42 are radially aligned with a low-pressure inlet 50 and a high-pressure outlet 52 provided within the back plate 38 to allow fluid (gas) to vent there through. The power rotor 40 is shown in FIG. 1 as a wave rotor, but other types of CvR rotors may be used.

Figure 7:
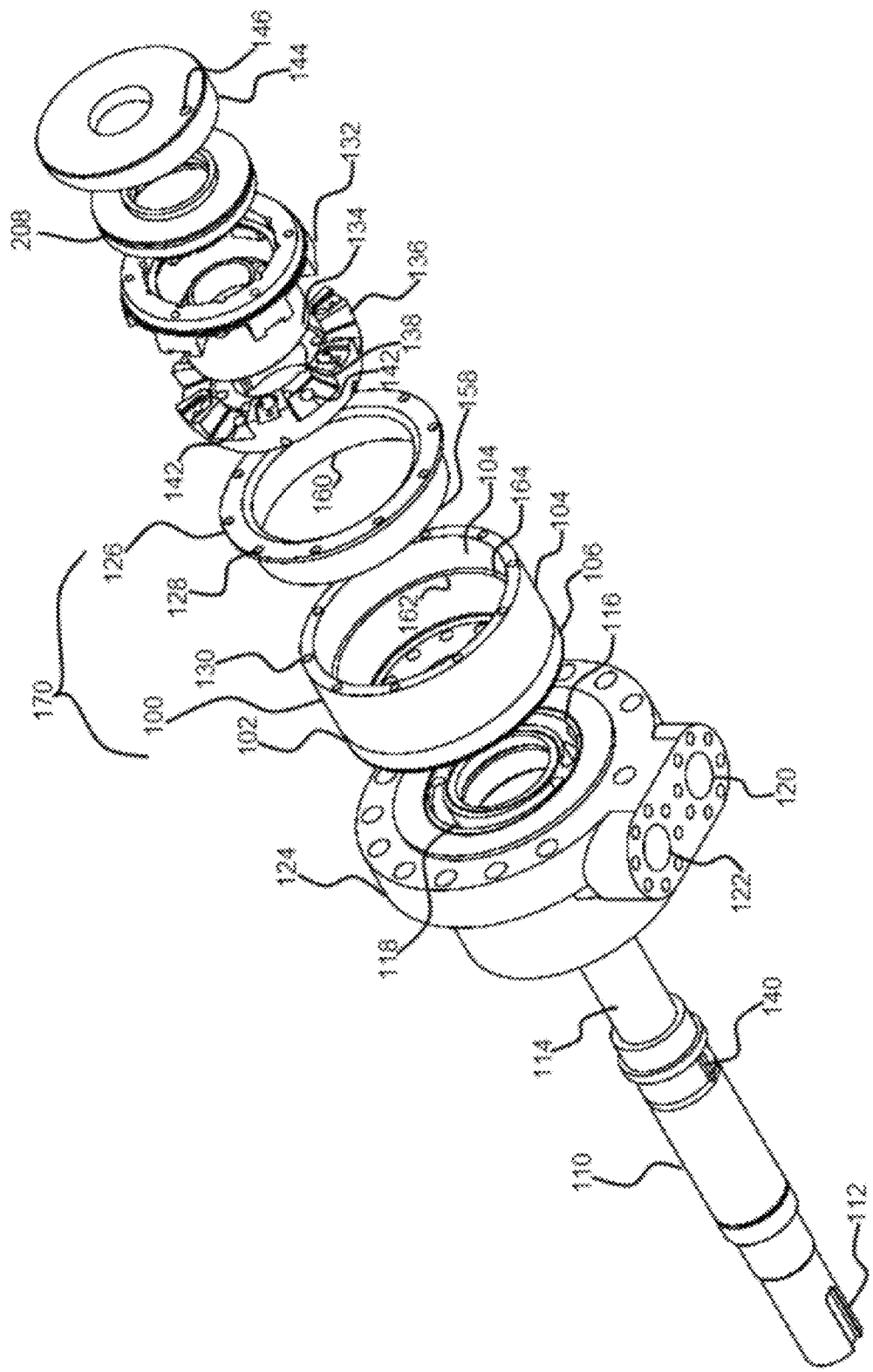
FIG. 7 is an isometric exploded view of one embodiment of the disclosure in a pump assembly.

A shroud 54 surrounds the power rotor 40 and slave rotor 32 and generally comprises an inner frusto-spherical surface 56. The shroud 54 can be designed to be split axially, as shown by way of example in FIG. 1, or circumferentially as shown in FIG. 7, depending on the pressure, positive sealing ability, and rotational speed for different applications. In the embodiment shown in FIG. 1, the shroud 54 comprises a first half 54a and a second half 54b, which can be connected in many different ways, including pins, set into a plurality of voids 58 within each half of the inner shroud 54. One of ordinary skill in the art would readily be able to understand how this is accomplished. Once in proper position, a retaining ring 60 may be placed around the annular recess 62, and an outer sleeve 64 may be disposed around the two halves 54a and 54b of the inner shroud 54, mainly to counter the centrifugal forces directed outward by the rotation of the shaft 22 and rotors, as well as the expansive forces of the gas within the compressor assembly 20. A second annular ring 66 may be set within a second annular recess 68 in order to further secure the two halves of the inner shroud 54 and to assist in retention of the outer sleeve 64. In one form, the rings 60 and 66 are made of spring steel and are split as shown regarding the ring 66.

As the power rotor 40 in one form is configured to rotate with the shaft 22 and with the inner shroud 54, a plurality of voids 70 may be provided within the inner shroud 54 to allow pins to be set through the inner shroud 54 into the power rotor, such as into voids 72, to maintain a rotational and reciprocating connection therewith.

Figure 4:
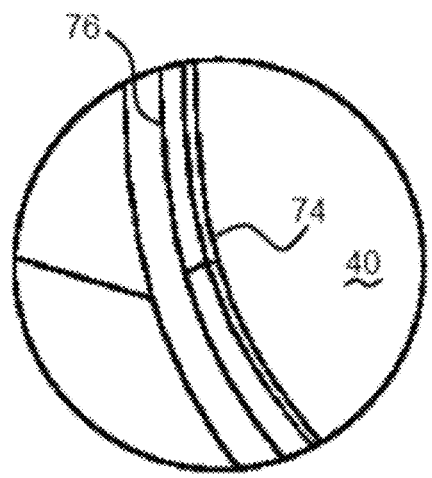
FIG. 4 is a detail view of one embodiment of the disclosure taken from the region 4 indicated in FIG. 1.

Looking to FIG. 4, which is a detail view of one region shown in FIG. 1, a plurality of circumferentially oriented seals or lips 74 may be set within an annular recess 76 of the power rotor 40. These circumferentially oriented seals or lip 74 are configured to provide a seal between the power rotor 40 and the inner shroud 54. The circumferentially oriented seals or lips 74 on the power rotor 40 may be rigidly attached to the shroud as static seals, as there is no substantial motion between the shroud 54 and the power rotor 40. In a preferred form, the tolerance (space) between the inner surface 56 of the inner shroud 54 and the outer surface of the power rotor 40 should be very tight to minimize leakage past the seals 74. In one form the seals 74 are a unitary structure, although in the embodiment shown in FIG. 1 the seals 74 comprise a plurality of mirror image, S-shaped seals, which may be easier to produce and install than unitary seals.

Figure 3:
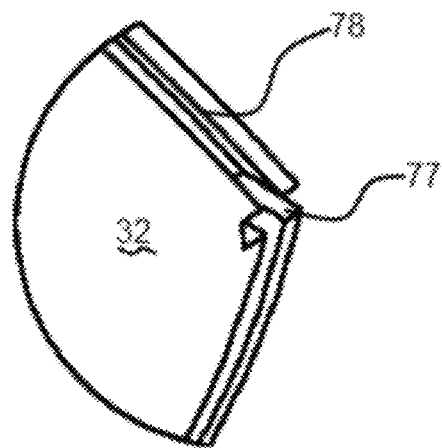
FIG. 3 is a detail view of one embodiment of the disclosure taken from the region 3 indicated in FIG. 1.

Looking to FIG. 3, which is a detail view shown in FIG. 1, there is shown a plurality of radial grooves 77, into which would be fitted a plurality of apex seals (not shown), and an outer, substantially annular groove 78 within the slave rotor 32, into which a plurality of side seals could be placed. In the embodiment shown in FIG. 5, the radial grooves 77 are deeper than the outer annular groove 78. In this embodiment, the radial seals may extend outward and abut against the inner surface of the shroud, and the outer annular seals may abut against the sides of the radial seals, although other configurations are possible. As the slave rotor 32 in one form substantially rotates with the inner shroud 54, but around an axis that is at an offset angle 80, with respect to the shaft 22 as can be seen in FIG. 2, the slave rotor 32 will encounter some rotational and reciprocating movement relative to the inner shroud 54. In some embodiments, there are a different number of mounds 48 and valleys 44 on the power rotor 40 than provided on the slave rotor 32. Looking to FIG. 5, which is also a detail view of FIG. 1, the radial groove 77 extends toward the center portion of the slave rotor 32 to the bearing 23. In addition, as the slave rotor 32 encounters relative reciprocating motion to the inner bearing 23, another substantially annular inner groove 82 would be provided therewith to receive an inner annular seal (not shown). In one form, the apex and side seals between the slave rotor 32, annular recess 68, and the bearing 23 may be similar to those used in Wankel engines, such as would be well known to one of ordinary skill in the art. In one form, comparing FIGS. 2 and 3, the annular groove 78 can be seen with an annular seal 96 therewithin. Additionally, comparing FIGS. 2 and 5, the annular groove 82 adjacent the bearing 23 can be seen housing an annular seal 98. In one form, the annular seals are split, pre-loaded seals with apex seals therebetween. This additional seal prevents leakage escaping out of the shroud. These seals encounter mainly reciprocating motion between the slave rotor 32 and inner surface 56 of the inner shroud 54, therefore friction loss is quite low.

Figure 6:
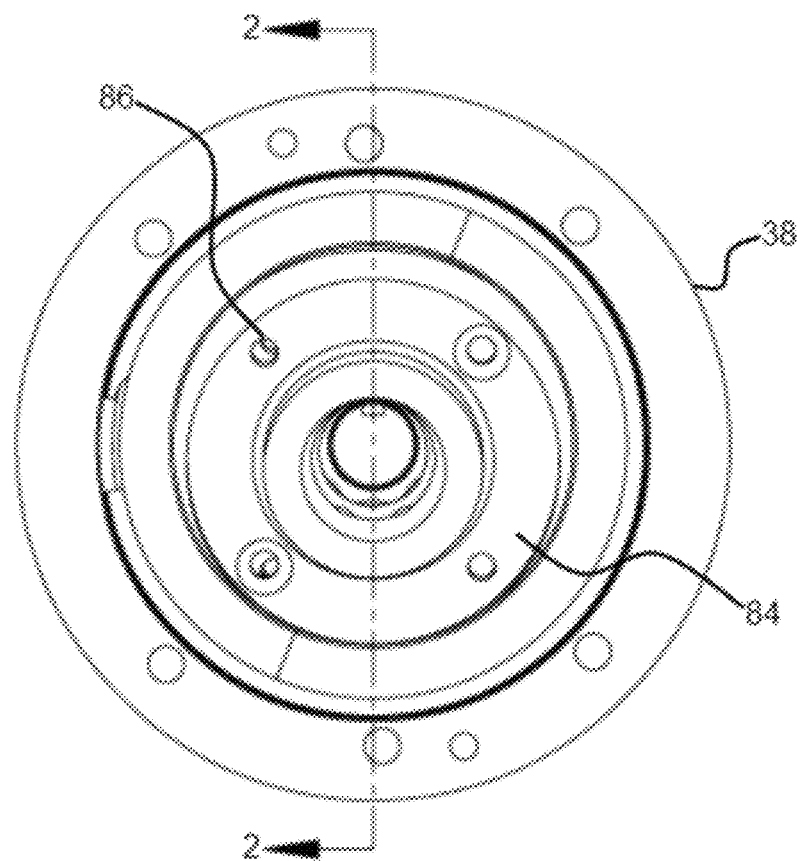
FIG. 6 is an end-assembled view of one embodiment of the disclosure shown in FIG. 1.

Looking to FIG. 2, which is a cutaway view taken along line 2-2 of FIG. 6, the independent components of the compressor assembly 20 can be easily understood as assembled in one form. Additionally, the offset angle 80 can more easily be seen in FIG. 2 than in other Figures. In one form, the bolt plate 84, as can be seen in FIGS. 1 and 6, comprises a plurality of voids 86 that align with voids 88 in the slave rotor 32, such that the bolt plate 84 can be attached thereto. Additionally, the bolt plate 84 in one form comprises a surface 90 which interoperates with the indexer ring 30, comprising a plurality of indexers 31 which in turn interoperates with the indexer surface 28 of the bearing 23, previously described.

Also shown in FIG. 2, the retaining rings 60 and 66 can be seen along with their function to hold the inner shroud 54 in place relative to the outer sleeve 66. The outer sleeve 64 may be press fit, shrink fit, or in close tolerance to the outer surface of the inner shroud 54. As shown in FIG. 1, the outer sleeve 64 comprises a width 92 which is substantially identical to the width 94 between the retaining rings 60 and 66.

One of the larger benefits of this design, compared to previous designs is that by utilizing a rotatable shroud design as shown one can utilize positive seals similar to those previously found in Wankel engines, combined with the benefit that the relative speeds occurring on the seals can be reduced in some embodiments by a factor of ten compared to prior designs. This reduction in the relative speeds allows the apparatus to operate with positive sealing at much higher revolutions per minute (RPM) than previously allowed. Another benefit of this design in some embodiments is the reduction in the number of leakage paths by approximately a factor of two over previous embodiments. As one of the rotors is now substantially fixed (and completely sealed) relative to the shroud, positive seals can be utilized between this rotor and the shroud and shaft. Some prior art embodiments utilize two rotors with clearances to a non-rotational housing, which increase the relative rotation and oscillation therebetween.

As previously discussed, the shroud may be split axially, as shown in FIG. 1, or may be split circumferentially, as shown in FIG. 7. FIG. 7 shows an outer shroud 100 having sealing land 102 such that the outer shroud 100 comprises a forward portion 104 and a rear portion 106. In this embodiment, the shaft 110 is functionally the same as previously described, and may include a keyway 112 and oil ports 114, which function similar to those previously described.

The embodiment shown in FIG. 7 is configured to function as a pump and thus has a plurality of ports, comprising a first port 116 and a second port 118, which are fluidly coupled to a first vent 120 and second vent 122 respectively, provided in the back plate 124. While the inlet 50 and outlet 52 of the embodiment shown in FIG. 1 were of different sizes in the pump configuration shown in FIG. 7, in the pump configuration there may be no substantial compression of the fluid (liquid) passing through the pump, and therefore the ports 116 and 118 are shown substantially identical in size.

The embodiment shown in FIG. 7 also comprises an inner shroud 126, comprising voids 128 through which bolts or other fasteners can be passed to engage voids 130 in the outer shroud 100 to fix the inner shroud 126 thereto. In one form, voids 108 are provided, as shown in the embodiment depicted in FIG. 8, through which the fasteners may pass and be connected. Additionally, a first rotor 132 is provided, which indexes from the indexer surface of the bearing 134, and a second rotor 136 is provided, which is coupled to rotate with the shaft 110, such as by a keyway 138 that engages a key, set within a keyway 140 within the shaft 110. Of course other mechanisms can also be utilized. The second rotor 136 in one form comprises ports 142 which are in radial alignment with the ports 116 and 118 to allow passage of the fluids therethrough.

In one form, the inner shroud 126 comprises a circumferential edge 158 having an inner diameter 160 substantially the same as the inner diameter 162 of the inner portion of a shoulder 164 within the forward section 104 of the outer shroud 100. When compared with the view of FIG. 8, it can be seen how these components allow assembly of the apparatus, as the largest diameter of the first rotor 132 and second rotor 136 would normally be larger than the smallest diameter 166 or 168 of the outer shroud 100 or inner shroud 126, respectively. The second rotor 136 and optionally the first rotor 132 in one form each comprise a unitary structure, as shown in FIG. 7. Thus, without the ability to disassemble the shroud assembly 170 (combination of outer shroud 100 and inner shroud 126), it would be extremely difficult if not impossible to assemble the apparatus (pump) as shown with the tolerances required.

Figure 8:
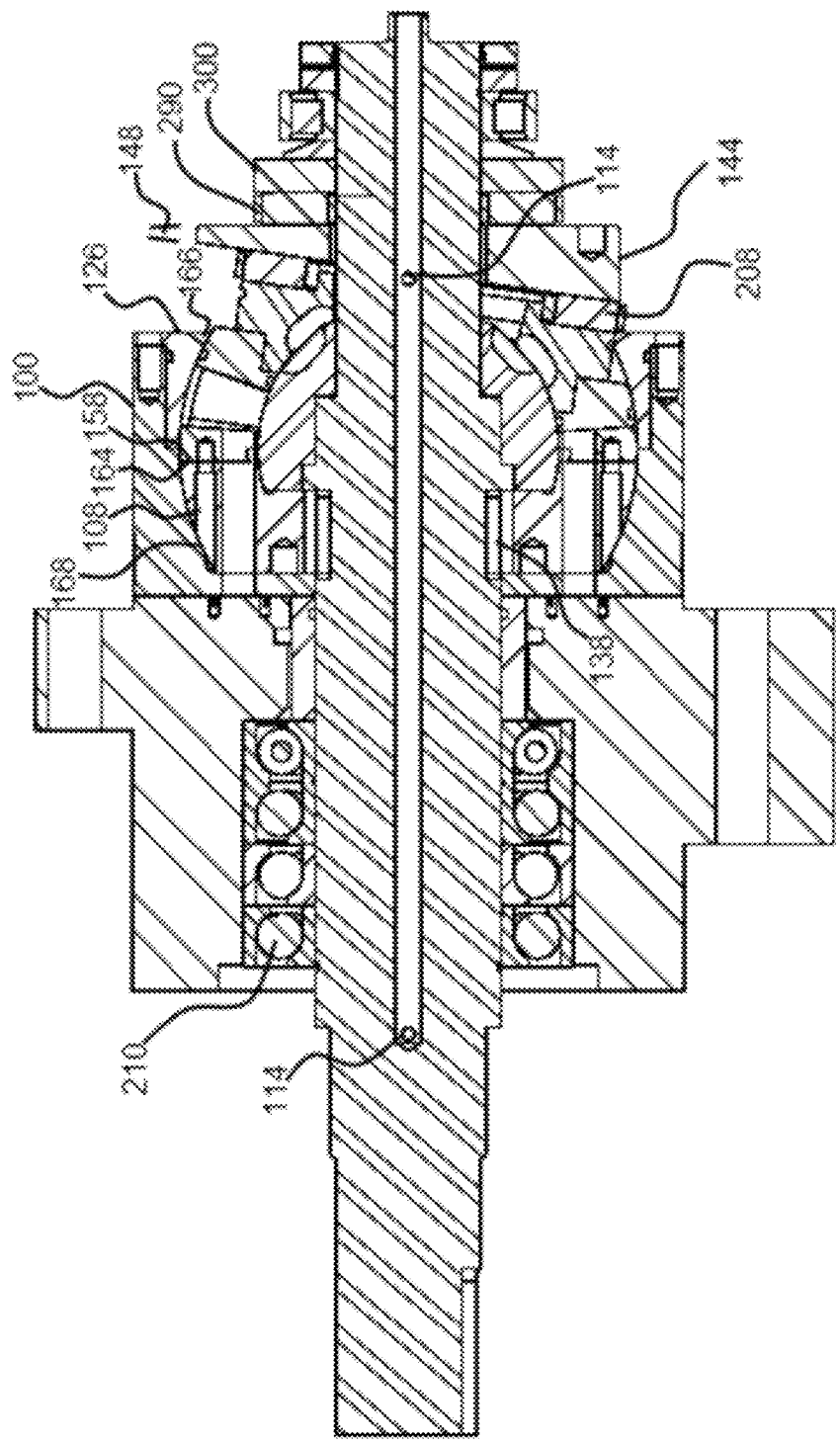
FIG. 8 is a cutaway-assembled view of one embodiment of the disclosure shown in FIG. 7.

One additional difference between the embodiment shown in FIG. 7 and that shown in FIG. 1 is the addition of a fixed angle plate 144 comprising a void 146 which holds a pin to prevent rotation of the fixed angle plate 144. The fixed angle plate 144 does not rotate with the shaft 110 in this embodiment, but rather provides the offset angle 148, as shown in FIG. 8, and a thrust roller bearing 208 which may also be used in the previously described embodiments. The structure 210 is a stack of angular contact bearings which are configured to support a thrust load and radial load on the shaft.

Figure 9:
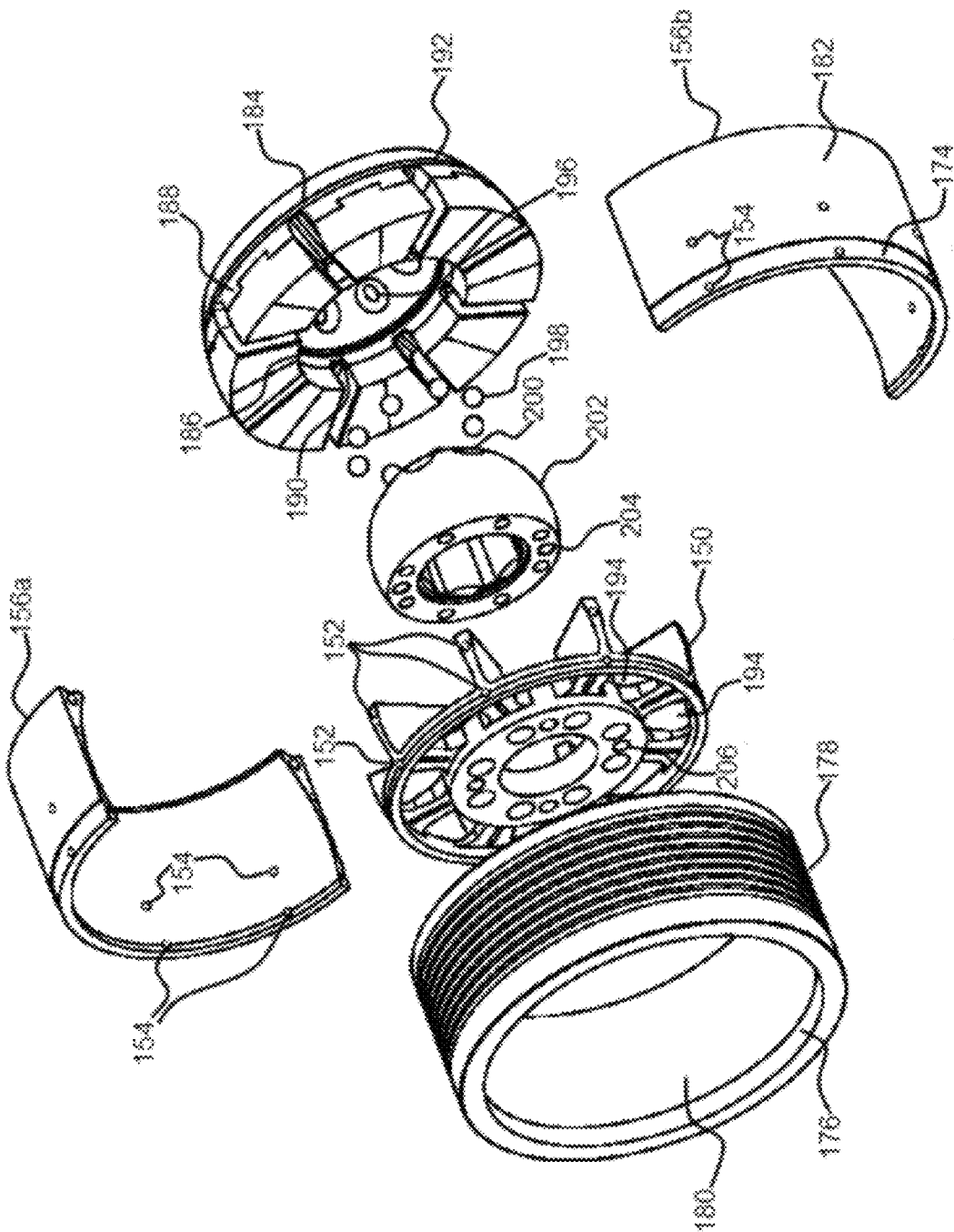
FIG. 9 is an isometric exploded view of one embodiment of the disclosure in an expander assembly.

Another arrangement for the shroud is shown in FIG. 9, where the inner shroud 156 is split axially (156a/156b) as was previously described relative to FIG. 1. However, in this embodiment, the first rotor 150 comprises a plurality of pin receivers 152 which are aligned with pin receivers 154 in the inner shroud 156 such that when the apparatus is assembled and pins, bolts or other fasteners are passed therethrough, the pins maintain relative position of the inner shroud 156 relative to the first rotor 150. In this embodiment, the inner shroud 156 comprises a shoulder or cutaway portion 174 which is configured to interoperate with a shoulder or projection 176 extending from the inner surface 180 of an outer sleeve 178. In one form, the inner surface 180 of the outer sleeve 178 is substantially identical in radius to the outer surface 182 of the inner shroud 156. Thus, the outer sleeve 178 may be coupled to the inner shroud 156 by way of a shrink fit, press fit, interference fit, adhesives, fasteners, or other equivalent connection so as to counteract expansion of the sleeve due to pressure and centrifugal force.

Sealing rings 184 and 186 are shown on the outside diameter 188 and inner diameter 190 of the second rotor 192, respectively. Clearance gaps are minimized elsewhere to provide a minimal, controlled leakage path instead of using prior contacting seals in one form. Inlet and outlet porting occurs through the back of the first rotor through ports 194, which are substantially larger than the ports shown in other embodiments.

In one form, shown in FIG. 9, indexing is accomplished with oval grooves 196 in the second rotor 192 and spherical bearings 198, which are installed between oval grooves 200 in the bearing 202 and oval grooves 196. As shown, the oval grooves 200 are formed into the bearing 202. In one form, the bearing 202 comprises voids 204, which align with voids 206 in the first rotor 150 to allow the first rotor to be pinned, bolted, or otherwise affixed to the bearing 202, in one form. Voids may also be provided for passage of lubricants.

The embodiment shown in FIG. 1 can be easily modified by one of ordinary skill in the art to be utilized as an internal combustion engine. Sealing could be designed for high temperatures and pressures similar to that encountered by Wankel type engines. Such an internal combustion engine may or may not utilize external valves on the inlet/outlet and may also utilize igniters, such as common spark plugs, or alternatively may operate on the principles used in diesel engines.

Figure 11:
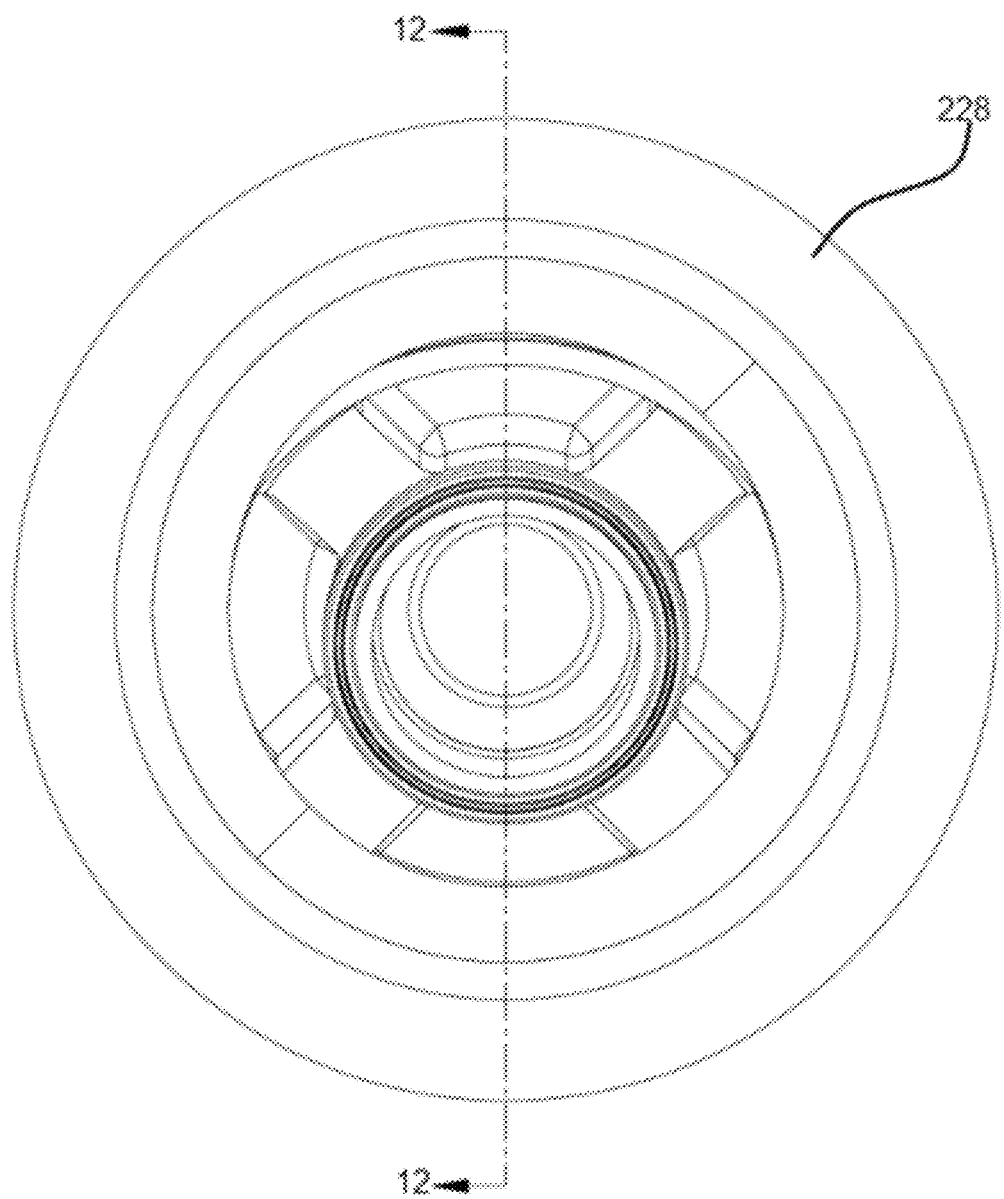
FIG. 11 is a front view of another embodiment of the disclosure.
Figure 12:
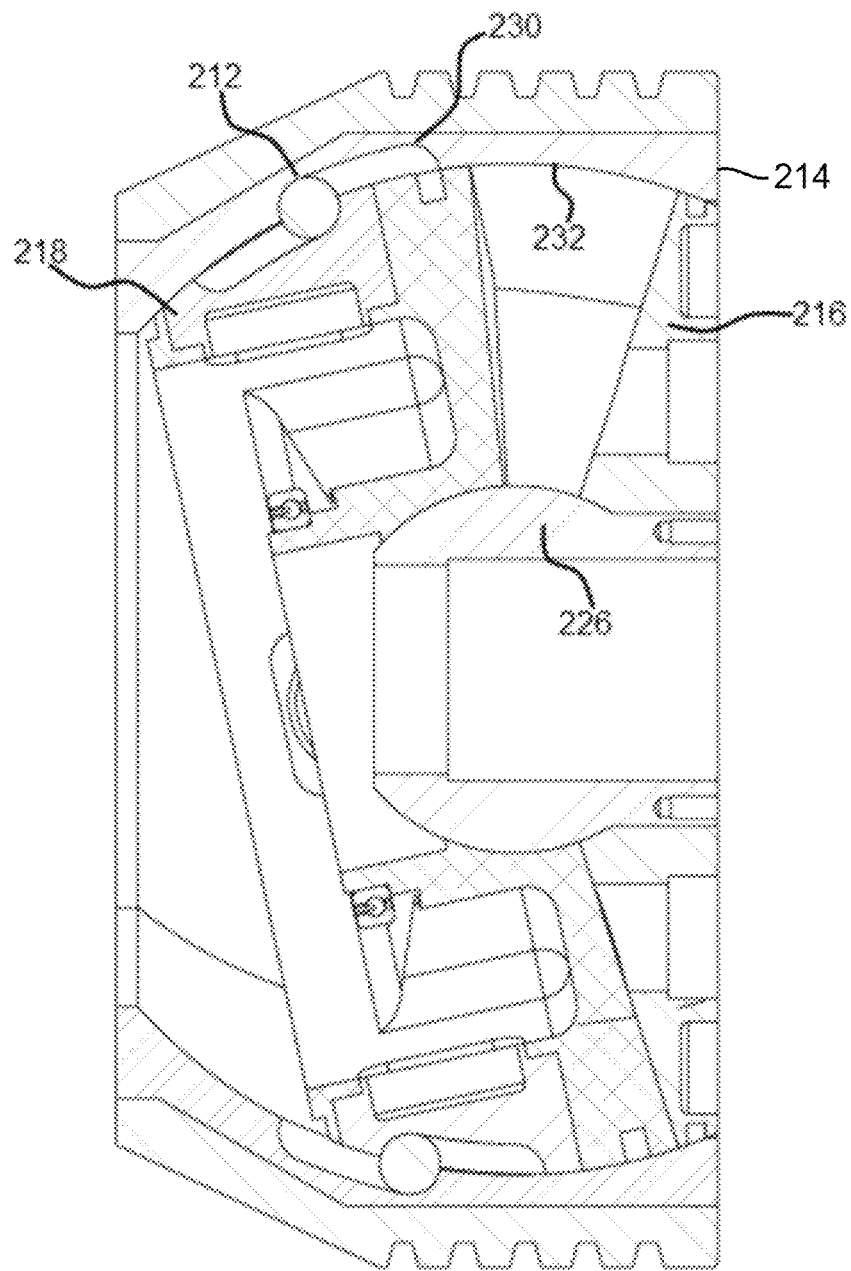
FIG. 12 is a side cutaway view of the embodiment shown in FIG. 11 taken along line 12-12.
Figure 18:
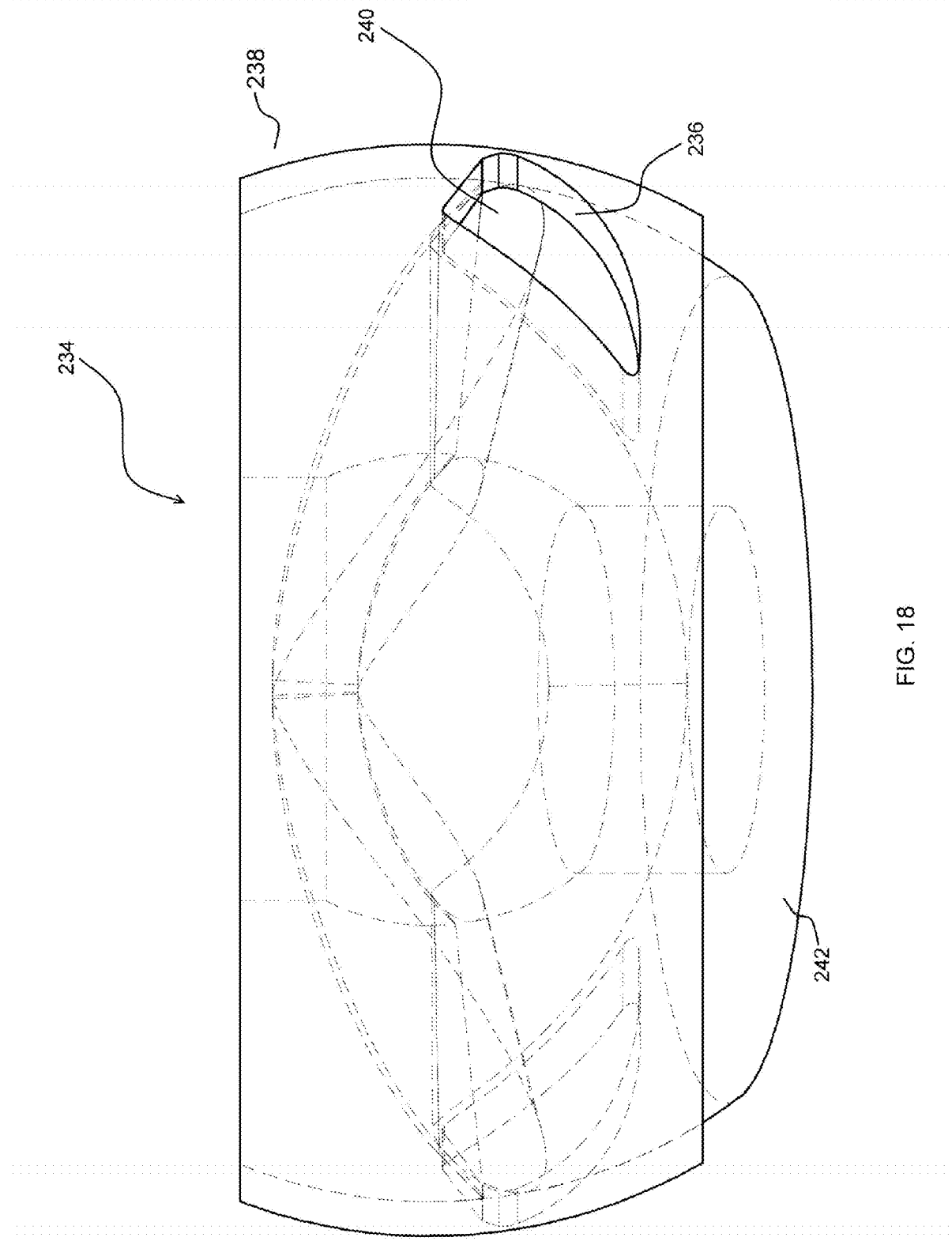
FIG. 18 is a hidden line view of the embodiment of FIG. 14.
Figure 22:
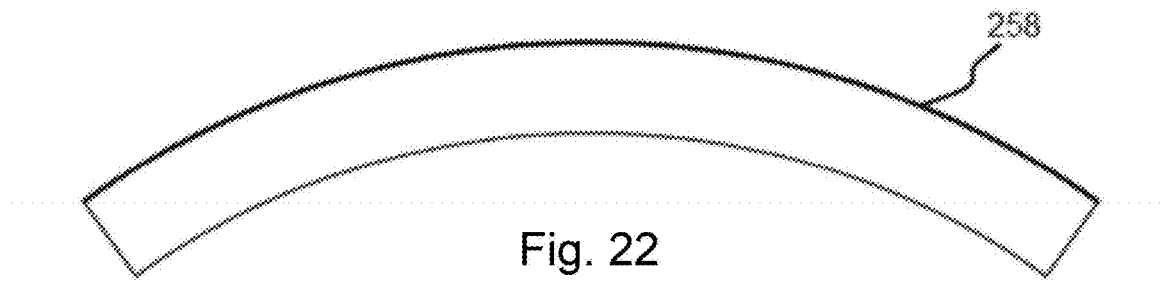
FIG. 22 is a plan view of one embodiment of a straight circumferential seal.
Figure 23:
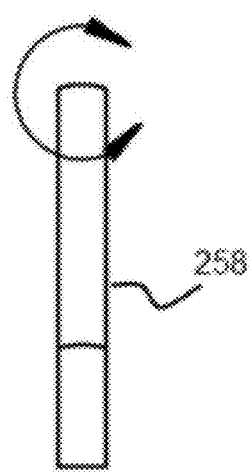
FIG. 23 is an end view of the seal of FIG. 22.
Figure 23A:
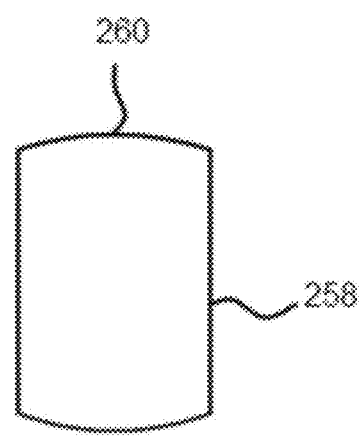
FIG. 23A is a detail view of the embodiment of FIG. 22.

FIGS. 11-13 disclose another embodiment for a potential compressor design (or could be other fluid handling devices as well). The difference here is that the ball bearing indexers 212 engage recesses 230 provided in the inner surface 232 of the inner shroud 214 (214a/214b). This results in higher ball bearing rolling speed, however, there is a much higher torque capacity now with less, or smaller balls because the moment-arm is much larger with the indexer balls located radially outward in the device. Lubrication can be attained by having oil presented through the rotors 216 and 218 and up through oil ports 220 in the inserts 222 that can be made of a harder material, for the indexers 212 to roll in. The indexers may be received into voids 224 provided in the second rotor 218. In this embodiment, the indexer 212 does not have to be directly attached to the shaft, but instead may be indirectly attached to the shaft through the shroud assembly. An outer shroud 228 may be provided as previously described.

Another embodiment of the shroud 234 is shown in FIGS. 14-18, where a surface 236 defining a port is cut through the shroud body 238 to allow fluid to pass there through. The port can be either an inlet port or an outlet port depending on its exact profile. As shown in FIGS. 14-18 the port can be shaped in such a way as to be open to a cavity 244 between the opposing rotors 240 and 242 during the fluid inlet phase of operation and closed during the fluid compression or outlet phase, or vice versa. This arrangement simplifies the porting requirements on the back face of the rotor described above.

The port formed in the shroud in this embodiment alternates between being open and being closed due to a speed differential between the rotors. In one form, the shroud is fixed to the first rotor, which in this embodiment has two lobes, and the other rotor has 3 lobes and thus rotates ⅔ of a rotation for every rotation the first rotor. As the second rotor is moving relative to the shroud, the second rotor can intermittently block the port.

A rotor assembly 246 in one form comprises the first rotor 240 and the second rotor 242 having respective center axes that are offset from co-linear, and having lobes 248 and valleys 250. In one form, the rotor assembly is arranged where the first and a second rotor each with an outer surface 252/254 that comprises part of a spherical surface arranged in such a way that each spherical surface shares a common center. In this embodiment, the shroud body 238 may be arranged wherein the shroud body 238 comprises an inner spherical surface 256 operatively configured to surround the outer spherical surfaces 252/254 of the rotors 240/242 respectively. In one form, the shroud body 238 rotates at some angular velocity in the same direction as the rotors 240/242.

The embodiment shown in FIGS. 14-18 may be combined with elements shown above. For example, the rotor assembly may be arranged where the shroud body is split axially as shown in FIG. 1, or radially as shown in FIG. 7 to facilitate assembly over the outer spherical surfaces of the rotors.

Where the shroud body split, the shroud body may be surrounded by a sleeve such as the sleeve 64 of FIG. 1 in such a way that radial forces from the shroud body are taken up as hoop stress in the sleeve 64. The sleeve 64 may be coupled to the shroud body by an interference fit that places a inwardly radial preload on the inner shroud components. FIG. 1, shows one example of the inner shroud components 54a and 54b, with the outer sleeve 64.

The rotor assembly as described above may be arranged where the shroud body 238 is fixed in relation to the first rotor in such a way that relative motion only occurs between the shroud body 238 and the second rotor. In one form of this embodiment, the shroud body 238 is integral and monolithic with the body of the first rotor 240.

The rotor assembly may be arranged where the shroud body rotates on an axis that is distinct from the axes of the first and the second rotors.

In one embodiment, the shroud body comprises one or more surfaces 236 defining radial ports that are shaped in such a way as to be blocked by the rotor lobes 248 during part of a rotation, and open for the remainder of the rotation where the ports are aligned with the valleys 250 of the rotors 240/242. The rotor assembly may be configured where the ports are arranged in such a way that a given port is open during part or all of the phase of rotation where the associated inter-lobe volume is increasing in such a way that the ports act as fluid inlet ports, or alternatively as fluid outlet ports.

Figure 5:
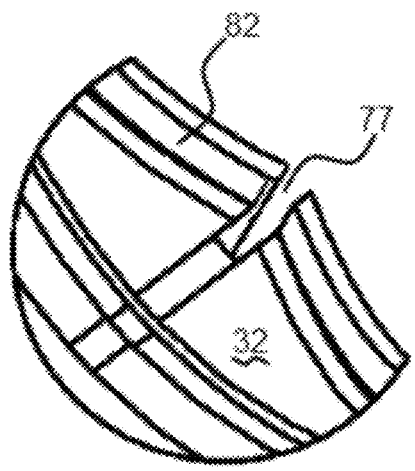
FIG. 5 is a detail view of one embodiment of the disclosure taken from the region 5 indicated in FIG. 1.

The rotor assembly may be arranged where the outer spherical surface of the rotors comprises a plurality of circumferentially oriented seals such as those shown in FIGS. 3-5, which engage with the inner spherical surface of the shroud. The seal members may comprise positive contact seals such as a mechanical seal or polymer lip seal. The seal members may alternatively comprise non-contacting seals such as a labyrinth seal or a gas lubricated mechanical seal, or may even combined into a single integral and/or monolithic seal member on one or each rotor. In another form, the seals may also comprise a plurality of S-shaped seals 257 as shown in FIG. 1, and shown in one form as the seals 74 of FIG. 4. These seal members comprise a plurality of "S" shaped seals where the seal bodies themselves are curved in one direction to contact the inner frusto-spherical surface of the shroud. In this embodiment, the rotor assembly may be arranged where one or more rotors comprise radial grooves in the apex of each rotor lobe in which is fitted a plurality of seal bodies operatively configured to engage the lobes of the opposing rotor as well as engaging the inner ball surface and inner surface 256 of the shroud body 238. In one form, this seal contacts the opposing rotor on its long edge, but also could contact the inside of the shroud at one end, and the center ball surface at the other end. This configuration may utilize rotor assembly as recited in claim 22 where the apex seal contacts the circumferentially oriented seals in such a way as to act as a continuous seal body. The seal that sits in the groove at the tip of the lobe (apex seal) needs to be in contact with the circumferential seals in such a way that no fluid can get past the junction. In one form, the apex seals and the circumferential seals interoperate to comprise a continuous sealing line that seals off the changing volume between a given set of lobes.

In one form as shown in FIGS. 19-24 the seal members comprise a plurality of planar seals 258 where the seal bodies themselves have a curved radially outer surface 260 to contact the inner frusto-spherical surface of the shroud. Such planar circumferential seals 258 fit into seal groves 262 formed in the rotors 264. In one form, a surface defining a dimple or hole 266 where each of the seal sections meet. These holes 266 are similar in function to the corner seals of Wankel engines.

In one form, cylindrical apex seals 270 as shown in FIGS. 24-25 are used having centerlines that lie on a plane that bisects the spherical surfaces 276/278, and are parallel to the back face 272 of the rotor 274. There are a couple of advantages to the use of such cylindrical apex seals 270. First, the diameter of the cylindrical apex seal can be made large enough so that any overhang of the rotor lobe tips that otherwise would make assembly of the rotor lobes over the center spherical surface 276 difficult, could be cut away by the apex seal slot in the rotor lobe tip. Overhang of the lobe tips can be problematic if the lobes protrude farther than the centerline 280 of the spherical surface 276. Assembly can be problematic as may be difficult to get the spherical surface 276 into the socket 282 without creating a leakage path.

The second advantage is that since the cylindrical apex seals 270 are on the plane bisecting the spherical surfaces 276/278 as described, then the cylindrical apex seal 270 ends can simply be hollowed out in such a way that the rim 284 of the cylindrical apex seals 270 fit tightly to both the inner and outer spherical surfaces and still remain rotationally symmetrical. This arrangement makes machining of the cylindrical apex seals much easier than prior art arrangements.

The third advantage of cylindrical apex seals is that since the cylindrical apex seals 270 are on the plane 280 bisecting the spherical surfaces as described, the cylinders can rotate on their axis without altering their sealing gaps. Rotating seals would tend to wear less and would also wear more evenly since the wearing surface 286 is a socket rather than a line. The seals in one form are on the plane bisecting the spherical surfaces in order for it to be possible for them to have the rotational symmetry required for proper sealing while rolling.

FIGS. 25 and 27 show cylindrical seals having indented ends 286/288. These end indents 286/288 can either be the same radius as the spherical mating surface (spherical surface 276), or they can be cut to some simpler shape such as a cone in such a way that only the rim 284 contacts the mating surface 276.

The rotor assembly in one embodiment is very useful when combined with elements shown in FIG. 7-8 where the load due to high pressure fluid between the lobes of the first rotor 240 (132 of FIG. 7) and second rotor 242 (136 of FIG. 7) is transferred from the back of the associated rotor through a thrust bearing 208 to a wedge-shaped plate 144 that is keyed to the housing (outer shroud 100), and then through another thrust bearing 290 to a thrust plate 300 that is fixedly attached to and rotates with the shaft 110 in such a way that the shaft is loaded in tension. The wedge shaped plate 144 in one form is fixed in rotation relative to the housing 100 of the device. The angle 148 of the wedge shaped plate 144 maintains the tilted rotor (first rotor 132) at its fixed angle 148 relative to the housing 100. The wedge shaped plate 144 in one form can be arranged to float in the axial direction, or could be pinned or keyed to the housing 100 to prevent it from rotating with the shaft 110.

Figure 10:
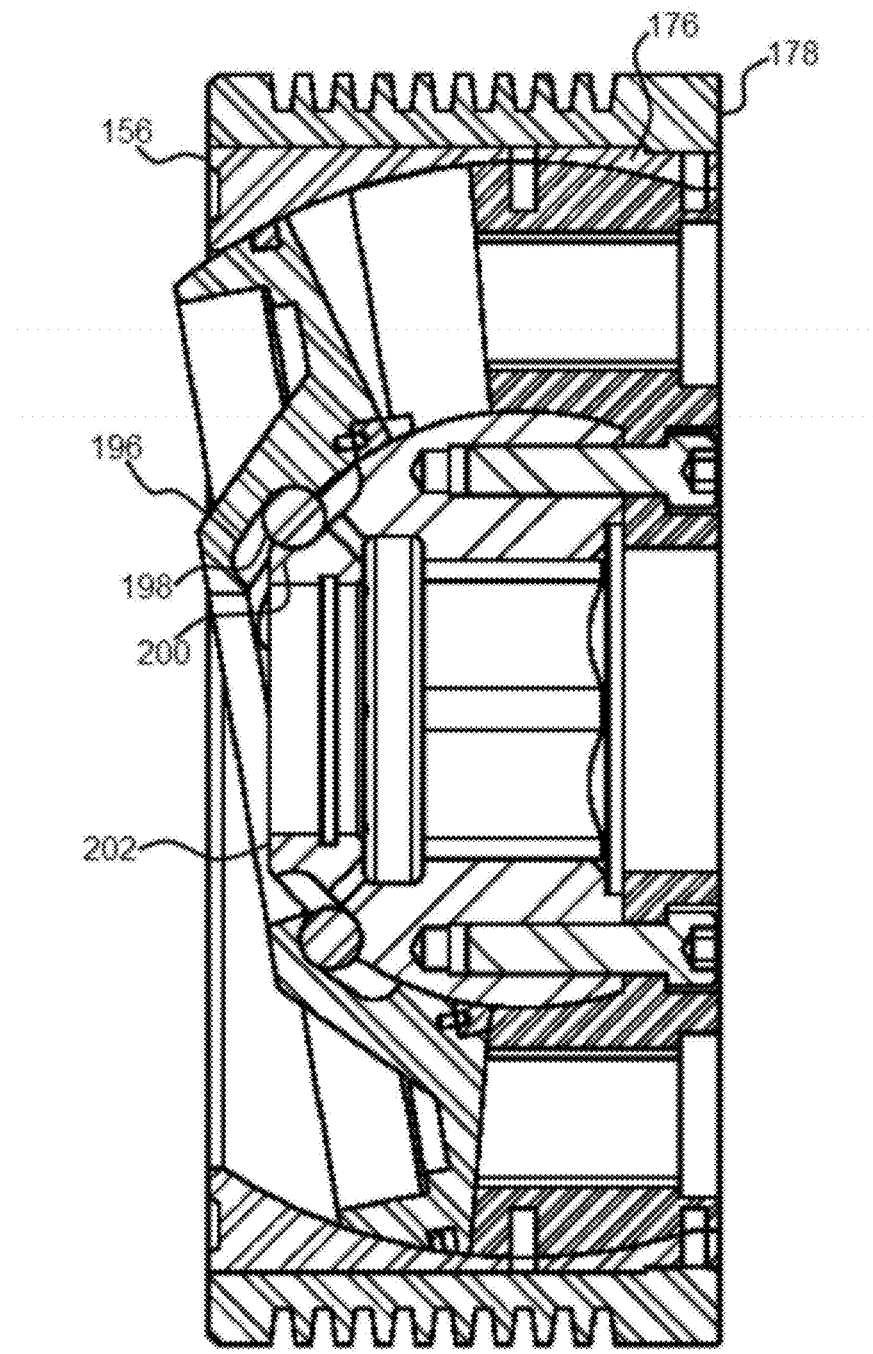
FIG. 10 is a cutaway-assembled view of one embodiment of the disclosure shown in FIG. 9.

The rotor assembly may also comprise a rotor indexing device such as one of the indexing systems described above. The indexing device may be integrated with the shroud to transfer torque between at least one of the first and/or second rotors 216/218 and the inner shroud 214 as shown in FIG. 12. The oval slot 230 may be cut into the spherical surface of the shroud to allow the shroud to act as an indexer. This is distinct from the embodiment shown in FIG. 10, where the slot 200 is cut in the center ball. The indexing device may be similar to the indexing system shown in FIG. 13 where the rotor indexing device consists of spherical balls 212 configured to roll in roughly oval tracks 220/230 cut in both the shroud inner spherical surface 256 and the outer surface 252 of the rotor(s) 240/242. Alternatively, the indexing device may consist of spherical balls configured to roll in roughly sinusoidal tracks 28 of FIG. 1 cut in both the shroud body inner spherical surface and the outer surface or at least one rotor. In other embodiments, trochoidal gears, involute gears, and peg slider/roller indexers can also be used. The defining features being that one half of each type of indexing system can be imbedded in the shroud, be it half of a gear indexer, or a peg type system, or a ball bearing system. Only the ball bearing indexer is shown in FIGS. as other indexer types are well known in the art, such as found in U.S. patent application Ser. No. 12/560,674 filed on Sep. 16, 2009 and incorporated herein by reference.

While the present invention is illustrated by description of several embodiments and while the illustrative embodiments are described in detail, it is not the intention of the applicants to restrict or in any way limit the scope of the appended claims to such detail. Specific elements of the embodiments shown above may be combined in different combinations, for example the rotors of FIG. 9 may be combined with the shroud of FIG. 1. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore we claim:

1. A rotor assembly comprising:
   a. a plurality of rotors comprising at least a first and a second rotor having respective center axes that are not co-linear, and each having lobes and valleys,
   b. the first and a second rotor each comprising an outer surface forming part of a spherical surface arranged such that each outer partial spherical surface shares a common center;
   c. a shroud body comprising an inner spherical surface operatively configured to completely surround the outer spherical surfaces of the lobes and valleys of both of the first and second rotors through a full rotation of the first and second rotors, and the shroud body rotates at some angular velocity in the same direction as the rotors; and
   d. where the shroud body comprises one or more surfaces defining radial ports.

2. The rotor assembly as recited in claim 1 where the shroud body comprises a plurality of axially split inner shroud components to facilitate assembly over the outer spherical surfaces of the first and/or second rotors.

3. The rotor assembly as recited in claim 2 where the shroud body is supported by a circumferential sleeve in such a way that radial forces from the shroud body are taken up as hoop stress in the circumferential sleeve.

4. The rotor assembly as recited in claim 2 where the shroud body comprises a plurality of circumferentially split inner shroud components to facilitate assembly over the outer spherical surfaces of the first and second rotors.

5. The rotor assembly as recited in claim 4 where the shroud body is surrounded by a sleeve which rotates with the shroud body in such a way that radial forces from the shroud body are taken up as hoop stress in the sleeve.

6. The rotor assembly as recited in claim 5 where the sleeve is coupled to the shroud body by an interference fit that places an inward radial preload on the plurality of circumferentially split inner shroud components.

7. The rotor assembly as recited in claim 1 where the shroud body is fixed in relation to the first rotor such that relative motion only occurs between the shroud body and the second rotor.

8. The rotor assembly as recited in claim 1 where the shroud body rotates on an axis that is distinct from the axes of the first and the second rotors.

9. The rotor assembly as recited in claim 1 where the radial ports are shaped in such a way as to be blocked by lobes of the first or second rotor during part of a rotation, and not blocked by lobes for the remainder of the rotation.

10. The rotor assembly as recited in claim 9 where an associated inter-lobe volume is increasing the radial ports act as fluid inlet ports.

11. The rotor assembly as recited in claim 9 where the associated inter-lobe volume is decreasing the radial ports act as fluid outlet ports.

12. The rotor assembly as recited in claim 1 where the outer spherical surface of the first and second rotors comprise a plurality of circumferentially oriented seals which engage with the inner spherical surface of the shroud body.

13. The rotor assembly as recited in claim 12 where the seal members comprise non-contacting seals selected from the list consisting of labyrinth seals and gas lubricated mechanical seals.

14. The rotor assembly as recited in claim 12 where the seal members consist of a single monolithic seal member.

15. The rotor assembly as recited in claim 1 comprising cylindrical apex seals having centerlines that are parallel to the back face of respective one of the first and second rotors upon which the apex seal is attached.

16. The rotor assembly as recited in claim 12 where the seal members comprise a plurality of planar seals where the seal bodies themselves are curved in one direction to contact the inner frusto-spherical surface of the shroud body.

17. The rotor assembly as recited in claim 1 where the first and/or second rotors comprise radial grooves in the apex of each rotor lobe in which is fitted a plurality of seal bodies operatively configured to engage the lobes of the opposing rotor of the respective first and/or second rotors as well as engage an inner ball surface and inner shroud body surface.

18. The rotor assembly as recited in claim 17 where the apex seal contacts circumferentially oriented seals as to act as a continuous seal body.

19. The rotor assembly as recited in claim 1 where the load due to high pressure fluid between the lobes is transferred from the back of the associated first or second rotors through a thrust bearing to a wedge-shaped plate that is keyed to a housing, and then through another thrust bearing to a plate that is fixedly attached to and rotates with the shaft such that the shaft is loaded in tension.

20. The rotor assembly as recited in claim 1 comprising a rotor indexing device is integrated with the shroud body to transfer torque between at least one of the first and/or second rotors and the shroud body.

* * * * *